Sept. 7, 1954 J. O. FORSTER 2,688,355
LOCK NUT
Filed June 26, 1952
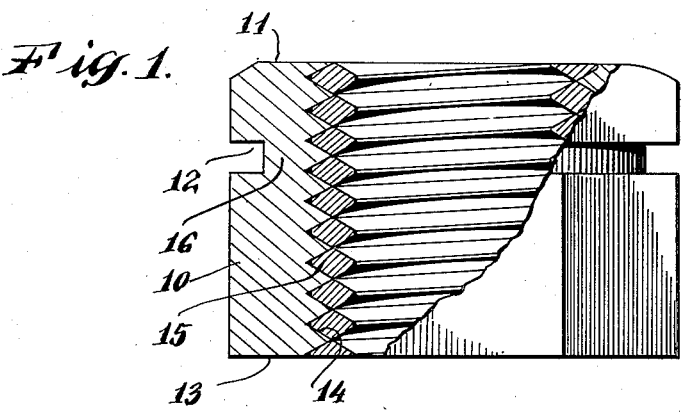
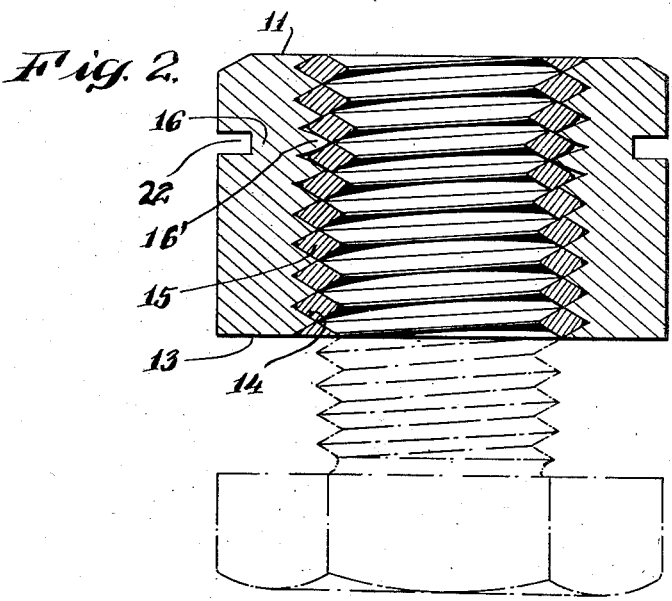
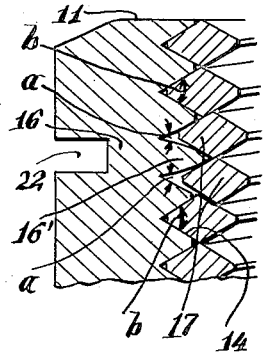
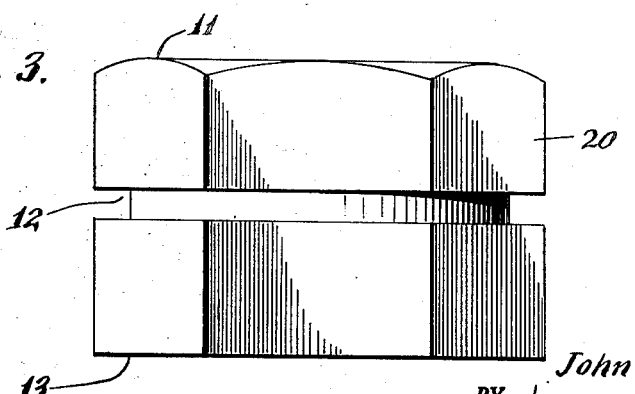
INVENTOR.
John O. Forster
BY Walter S. Pleston
ATTORNEY.

Patented Sept. 7, 1954

2,688,355

UNITED STATES PATENT OFFICE 2,688,355

LOCK NUT

John O. Forster, Harrison, N. Y., assignor to Heli-Coil Corporation, Danbury, Conn., a corporation of Delaware Application June 26, 1952, Serial No. 295,605

4 Claims. (Cl. 151—21)

The invention relates to a lock nut. Its object is the provision of a nut having excellent locking properties and which can be made heat-resistant so as to retain its locking properties if exposed to relatively high temperatures.

Another object of the invention is the provision of a lock nut comprising an interiorly screw-threaded barrel with a wire coil insert forming the female thread for a bolt to which the nut is to be applied, wherein the insert has self-locking properties with respect to both the nut barrel and the bolt.

The invention essentially consists in that the nut barrel with the insert therein is provided with a narrow zone in which the thread of the barrel is deformed so as to cause adjacent that zone, a slight reduction of the diameter of the insert, which may be also accompanied by a small reduction of the pitch of the insert.

The method by which the nut according to the invention is preferably made consists in that in a nut barrel with an external peripheral groove and with an internal thread of a form of a cylindrical helix throughout its whole length, a cylindrical wire coil is inserted whereupon the nut is subjected to axial pressure thereby to reduce the width of the groove and to deform the barrel thread adjacent the groove with the result that in that zone the diameter of the coil will be slightly decreased so as to cause an interference fit with a bolt for which the unit is destined.

Further objects and details of the invention will be apparent from the description given hereinafter and the accompanying drawing illustrating an embodiment thereof by way of example. In the drawing Fig. 1 is a side elevation partly in section of a nut with an insert therein prior to the final steps of the method according to the invention, Fig. 2 is a longitudinal cross section of the finished nut according to the invention, Fig. 2a is a partial cross section of the same nut at a larger scale, Fig. 3 is a side elevation of a modification of the nut of Fig. 2.

Referring now to the drawing; Fig. 1 shows the nut barrel 10 in the form as it may be made on a conventional nut-making machine. At a distance from the top surface 11 of the barrel, a peripheral groove 12 of substantial depth is cut in the barrel wall. In the example of Fig. 1 the location of the groove 12 is so selected that the portion between the groove and the bottom surface 13 corresponds to the height of a nut of standard dimensions. The barrel is provided with an interior screw thread 14 of constant pitch and diameter throughout. A cylindrical wire coil insert 15 is screwed into the thread 14. The shapes of the thread 14 and of the cross section of the coil wire may be selected as desired but must of course correspond to each other. For instance, rather than using a V-thread in the barrel and a diamond shaped wire cross section, the barrel thread may be round to receive a wire of circular or of pear shaped cross section. The material of barrel and insert may also be selected according to the purpose for which the nut is destined, but it is always recommendable to make the insert of a springy material which is harder than the barrel material. In most instances an aluminum barrel with a stainless steel insert will be suited. However, where the nut is exposed to a rather high temperature it may be preferable to use a barrel of a more heat-resistant material for instance of a high carbide tungsten alloy or a similar material.

When the wire coil 15 is inserted and in the position of Fig. 1, the barrel with the coil therein will be subjected to an axial pressure to which the material of the barrel in the zone of the smallest cross section, i. e. in the zone 16 adjacent the groove 12, will yield. In consquence, the width of the groove will be reduced as shown in Figs. 2 and 2a where the reduced groove is denoted by 22. Owing to the compression of the zone 16 the adjacent thread portion of the barrel will be so deformed, that the angle $a$ of the groove of the mentioned thread portion will become smaller than the angle $b$ of the non-deformed barrel thread. Simultaneously some of the material forming the thread convolution may be displaced inwardly as shown at 16'. Whereas, the resulting change of the groove 12 is irrelevant, the change occurring interiorly of the barrel is of vital importance. The change of the angle of the thread groove of the barrel, and also any inwardly directed displacement of the material, squeezes the engaging coil portion 17 inward thus slightly reducing the diameter thereof, whereby an interference fit is caused for a bolt provided with the nut. It is advisable so to select the width of the groove 12, that after the compression, the reduced coil portion will not be less than about one quarter of a convolution and not appreciably more than one convolution.

The locking effect of the nut is explained as follows:

Presuming, the nut consisting of the barrel 10 and the insert 15 is screwed on a bolt 18 indicated in dash and dot lines in Fig. 2, there will be a strong interference between the coil zone 17 and the bolt owing to the reduced diameter of that zone and a high radial pressure will be set up also between that zone 17 and the barrel at 16'. If, now a force tends to turn the nut in the direction to unscrew it, the high friction between the coil and the bolt at the zone 17 will tend to retain the coil. Therefore, turning of the nut in the direction of unscrewing it will tend to expand the coil convolutions between the zone 17 and the lower nut end to wedge these convolutions more firmly in the thread of the barrel and to restrain the turning force. This is also of great importance for the reason that hitherto a wire coil insert could not be securely located in a tapped hole or nut without the application of additional means or steps of operation. Thus the wedging action caused by the axial compression of the nut and occurring intermediate the ends of the coil will lock the insert in both directions by expanding it in the tapped hole. On the other hand, the interference between the zone 17 and a bolt on which the nut has been screwed will prevent the nut from spinning off freely. In addition when the nut is screwed down on the bolt to tighten it against the surface of the work piece, the zone 17 will displace and wedge itself between barrel and bolt. The friction between the zone 17 and the barrel will, then, prevent a relative shift of the two, as the coil portion between the zone 17 and the lower end of the coil will be contracted on the bolt to lock the connection against a force tending to unscrew the assembly.

As stated above, the location of the groove 12 with respect to the length of the barrel may be selected within wide limits. The location of the groove closer to the top than to the bottom as in Figs. 1 and 2 is preferable if it is the intention to make the lower end of the nut comply with specifications of a regular nut so that all the advantages of a regular nut be contained in the lower portion and the locking effect be an additional feature. In that event it is desirable that at least two convolutions of the thread are present between zone 17 and the barrel top. If the groove is arranged in the middle between the top and bottom surface of the barrel 20 as in Fig. 3, the occurring locking features will be alike regardless which nut end will be used as the leading end when applying the nut to a bolt. The width and depth of the groove 12 which in each case are best suited to the purpose will depend on the size of the nut and on the barrel material, and can be readily found by trial.

The method of producing a locking nut according to the invention, essentially consists in making a nut barrel with an exterior peripheral groove and an interior thread of constant pitch and diameter, inserting into the thread of the barrel a mating screw-thread forming cylindrical wire coil, and subjecting the barrel to an axial pressure, thereby reducing the width of the groove and reducing, in a zone adjacent the groove, the inner diameter of the barrel thread and of the wire coil. This method is advantageous over the obvious method according to which a barrel would be produced with an internal screw thread having a zone of reduced pitch and diameter, whereupon the wire coil would be screwed in. First, it would be difficult and expensive to make the desired thread on a nut-producing machine; second, it would be difficult to screw the wire coil through the zone of reduced diameter; third it would be rather cumbersome to gauge the thread as it is frequently necessary. Contrary, thereto no difficulties whatsoever are encountered in making a barrel as shown in Fig. 1 and inserting a wire coil. Furthermore, a gauge can be readily applied to the barrel and coil prior to the compression. The result of the gauging will, then, be correct too for the portions above and below the reduced zone after the compression.

It will be apparent to those skilled in the art that alterations and modifications of the structure shown are possible without departure from the essence and spirit of the invention which for that reason shall not be limited but by the scope of the appended claims.

I claim:

1. A lock nut comprising an internally screw threaded barrel, the flanks of the barrel thread groove being angularly related so as to enclose a space of wedgelike cross-section uniform throughout the axial length of said thread except for a narrow zone where the angle between said flanks is smaller than in the remainder of said thread, said zone being spaced from the upper and lower end faces of said barrel and being of an axial extension according to about the axial extension of one thread convolution, and a wire coil inserted into said barrel so as to engage the barrel thread groove throughout the length of said coil, the cross-section of the coil wire being uniform throughout, the outer portion of said coil being complementary in relation to said uniform barrel thread groove, and the inner portion forming a female thread for a bolt, said coil being also uniform in its diameter except for the coil portion in engagement with the thread of said narrow barrel zone where the diameter of said coil is reduced owing to the wedging action caused by the flanks of said thread groove in said narrow zone.

2. A lock nut as claimed in claim 1 wherein the height of said barrel between said narrow zone and said lower end face is substantially equal to the height of a standard nut fitting said screw bolt and wherein the height of said barrel between said narrow zone and said upper end surface is not less than twice the pitch of said barrel thread.

3. A lock nut as claimed in claim 1 wherein the width of said narrow zone is between one quarter of a convolution and one convolution of said barrel thread.

4. A lock nut as claimed in claim 1, said barrel being provided with an external peripheral groove adjacent said narrow zone, the barrel material between the bottom of said external groove and said barrel thread being axially compressed whereby the angle between said flanks of the thread groove of said barrel is reduced to said smaller angle and the inner diameter of said wire coil portion in engagement with said zone is decreased to said reduced diameter.

References Cited in the file of this patent

UNITED STATES PATENTS

| Number | Name | Date |
|---|---|---|
| 1,416,087 | Woodward | May 16, 1922 |
| 2,262,450 | Caminez | Nov. 11, 1941 |
| 2,363,663 | Findley | Nov. 28, 1944 |